(12) United States Patent
Tei et al.

(10) Patent No.: US 7,559,095 B2
(45) Date of Patent: Jul. 14, 2009

(54) THERMOTHERAPIC SAUNA APPARATUS

(75) Inventors: Reihi Tei, 2-6, Kibougaoka-cho, Kagoshima-shi, Kagoshima 891-0107 (JP); Kimiharu Nagase, Takaoka (JP); Moriaki Miyahara, Tachikawa (JP)

(73) Assignee: Reihi Tei, Kagoshima (JP)

( * ) Notice: Subject to any disclaimer, the term of this patent is extended or adjusted under 35 U.S.C. 154(b) by 37 days.

(21) Appl. No.: 11/748,153

(22) Filed: May 14, 2007

(65) Prior Publication Data

US 2007/0294818 A1 Dec. 27, 2007

Related U.S. Application Data

(63) Continuation of application No. PCT/JP2005/011197, filed on Jun. 13, 2005.

(30) Foreign Application Priority Data

Nov. 24, 2004 (JP) ............................. 2004-338846

(51) Int. Cl.
*A31H 33/06* (2006.01)
(52) U.S. Cl. ............................... 4/524; 607/83; 607/87
(58) Field of Classification Search ............... 4/524; 607/81, 83, 87
See application file for complete search history.

(56) References Cited

U.S. PATENT DOCUMENTS 1,564,552 A * 12/1925 Gerdes ................. 607/87
3,271,786 A * 9/1966 Joy ..................... 4/532
5,503,143 A * 4/1996 Marion et al. ........ 128/202.12
6,965,097 B2 * 11/2005 Lee ..................... 4/524 X

FOREIGN PATENT DOCUMENTS

| JP | 59-121878 | 8/1984 |
| JP | 61-146262 A | 7/1986 |
| JP | 61-209660 A | 9/1986 |
| JP | 05-228198 A | 9/1993 |
| JP | 08-154997 A | 6/1996 |
| JP | 2984188 B2 | 11/1999 |
| JP | 2004-290262 A | 10/2004 |

* cited by examiner

*Primary Examiner*—Robert M Fetsuga
(74) *Attorney, Agent, or Firm*—Ladas & Parry LLP

(57) ABSTRACT

In order to attain adequate thermotherapic effect in a sauna room without forcing any extra burden on a patent, an aged person or a disabled person, an intake/exhaust fan, a room temperature sensor for measuring the room temperature, and a planar heater radiating infrared rays are provided in the sauna room keeping dry hot atmosphere. A sequence controller controls the planar heater according to the output from the room temperature sensor such that a predetermined thermotherapic bathing pattern where the room temperature of the sauna room and the time are predetermined is attained depending on the setting of a thermotherapic mode.

2 Claims, 6 Drawing Sheets

THERMOTHERAPIC SAUNA APPARATUS

The present application is a continuation of PCT/JP2005/011197 filed Jun. 13, 2005, the contents of which are incorporated herein by reference.

TECHNOLOGICAL FIELD

The present invention relates to a therapeutic sauna apparatus employing the thermotherapic effect of a sauna bath.

BACKGROUND TECHNOLOGY

A sauna apparatus is usually furnished with an electric heater and a vapor generator in the sauna room, thereby keeping the room atmosphere wet at about 100° C. This type of sauna apparatus is effective for healthy people, in that it promotes perspiration and helps provide mind and body with a relaxation effect and recovery from fatigue. However, it is not proper for patients with heart failure, hypertension, or arrhythmia or aged people because this method puts an excessive burden on their hearts and vascular systems, thereby endangering their lives.

In order to attain an adequate thermotherapic effect, it seems to be desirable to make sauna bathing follow a predetermined bathing pattern with predetermined temperature and time. In other words, it is desirable to increase deep body temperature by maintaining a warming temperature for a given period that does not put an excessive burden on the body, followed by keeping a rise of body temperature to some degree by maintaining a heat-retention temperature for a given period that is slightly lower than the warming temperature.

Traditional thermotherapic sauna apparatus, however, can only provide a thermal effect for the sauna room. An apparatus has not been developed that can allow people to receive adequate thermotherapy in the sauna room according to the abovementioned predetermined bathing pattern.

Moreover, it is essential to guarantee safety for patients with heart failure, hypertension, or arrhythmia or aged people in using a thermotherapic sauna apparatus. However, no thermotherapic sauna apparatus has been developed that has taken such safety into consideration.

We came up with the present invention to solve the abovementioned problems. The purpose of the invention is to provide a thermotherapic sauna apparatus taking into consideration adequate safety that makes it possible to enjoy sauna bathing according to a predetermined thermotherapic bathing pattern without leaving the sauna room, whereby an adequate thermotherapic effect can be attained without forcing any extra burden on patients and aged people.

BRIEF DESCRIPTION OF THE INVENTION

A thermotherapic sauna apparatus according to the invention comprises a sauna room for keeping a hot atmosphere, furnished with an intake/exhaust fan, a room temperature sensor for measuring room temperature, a planar heater at a required place on the inner wall of the sauna room that radiates far infrared rays, and a controller for controlling the fan and heater sequence. Said controller controls said fan and said planar heater according to the output of said room temperature sensor so that the room temperature of the sauna room and the time can coincide with a predetermined thermotherapic pattern when the thermotherapic mode is set.

This type of thermotherapic sauna apparatus can demonstrate adequate thermotherapic effects by making sauna bathing possible according to a predetermined thermotherapic bathing pattern without leaving the sauna room by the operation of the automatic control of a controller.

The bathing pattern may be characterized by a setting that is a combination of the warming state that keeps a given warming temperature (Ha) required for increasing the deep body temperature of an occupant for a given warming time (Ta) and the heat-retention state that keeps a heat-retention temperature (Hb) that is lower than said warming temperature Ha for a given heat-retention time Tb. Unlike traditional apparatus, it therefore becomes unnecessary for an occupant to keep or maintain the heat-retention state by wrapping himself/herself in a blanket outside the sauna room after a period of the warming state, thereby reducing any burden on a patient, an aged person, or a disabled person.

The warming state may have a warming temperature Ha of about 60° C. and a warming time Ta of about 15 minutes. Said heat-retention state has a heat retention temperature Hb of about 40~45° C. and about 20~30 minutes of heat-retention time Tb. Therefore, it is possible to provide a further adequate thermotherapic effect based on the past therapeutic results.

The sauna room may be furnished with a report means such as a report buzzer that reports thermotherapic progress. The controller activates the report means such as the report buzzer at a time when said warming temperature Ha is attained, when said heat-retention temperature Hb is attained, and when said heat-retention time has elapsed. Hence, an occupant can adequately know about the progress of the thermotherapy, which can prevent the occupant from leaving the sauna room unexpectedly before thermotherapy is completed. In other words, the invention can help avoid such a problem as the interruption of therapy.

The sauna room may also be equipped with microphones and speakers both inside and outside the room so that people can make a conversation from both inside and outside of the room. Therefore, it is possible for an occupant who feels sick during thermotherapy to communicate with people outside the room through a microphone and a speaker without opening the front door or shouting in a loud voice. Thus, sufficient safety can be guarantied.

The sauna room may also be furnished with a gap between the entrance door and the entrance frame that is used for sending an IV drip infusion line connected to an IV drip infusion pipe to said sauna room from outside so that a patient subjected to IV drip infusion can receive it in the sauna room without removing the IV drip infusion pipe. Accordingly, even a patient with an advanced disease that requires IV drip infusion can receive thermotherapy in the sauna room without interrupting the IV drip infusion.

DETAILED DESCRIPTION OF A PREFERRED EMBODIMENT

Figure 1:
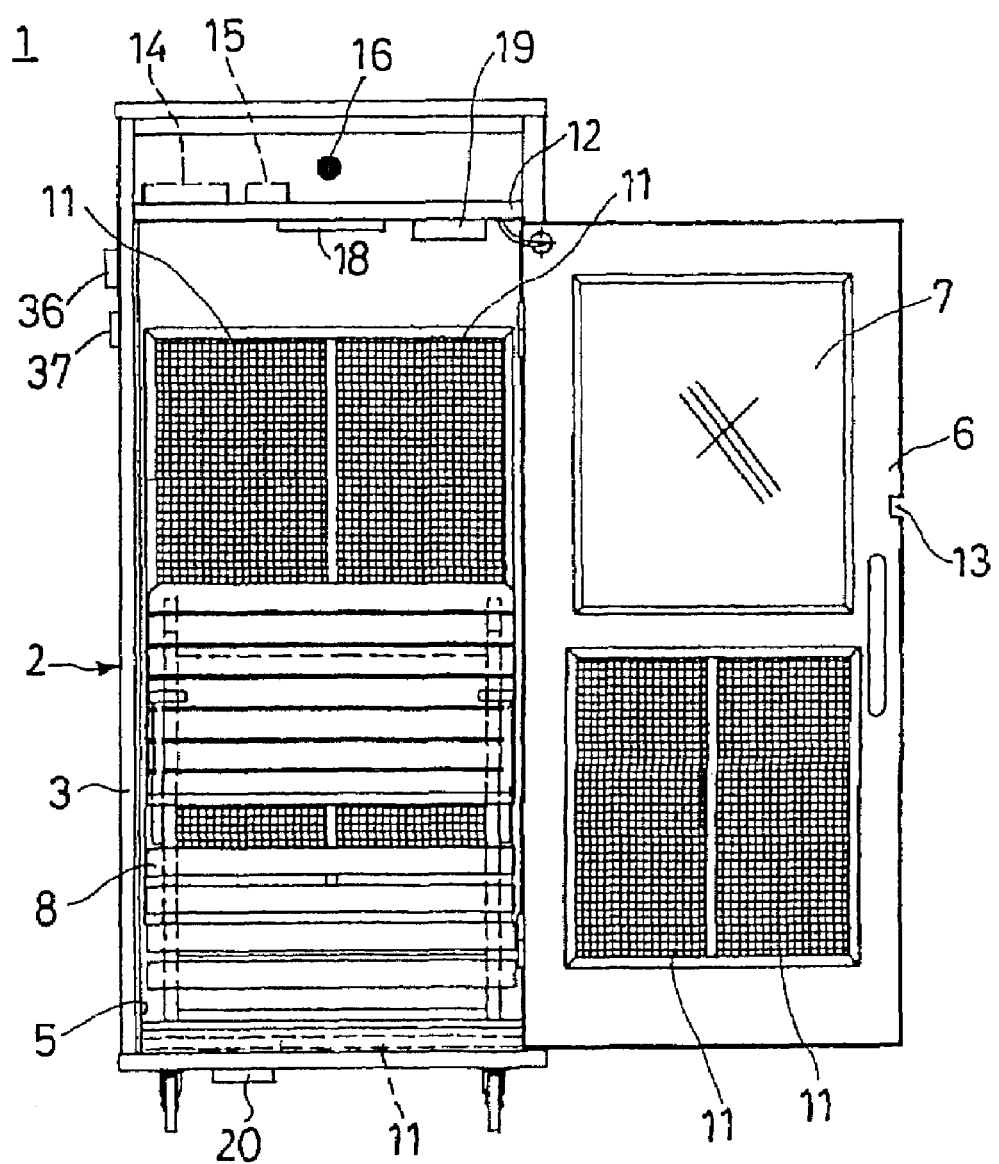
FIG. 1 is a front view illustrating the entire sauna apparatus used for thermotherapy with its front door open according to one embodiment of the present invention.
Figure 2:
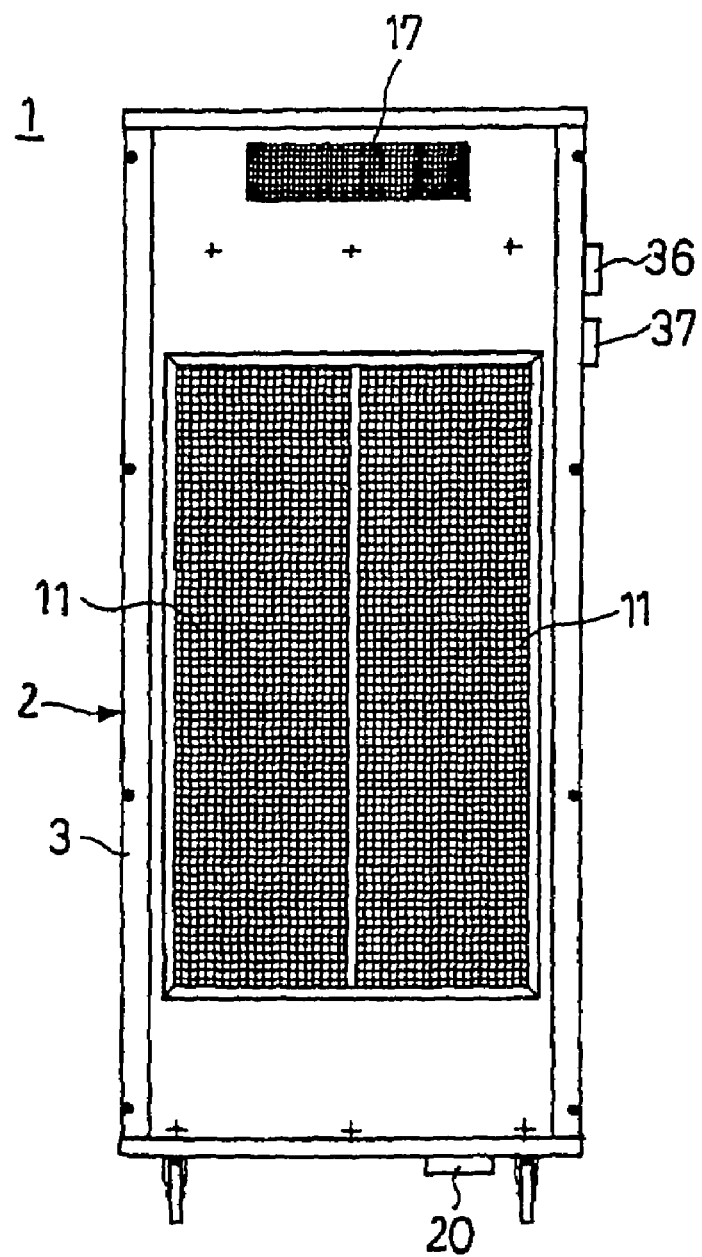
FIG. 2 is a rear view of the thermotherapic sauna apparatus.
Figure 3:
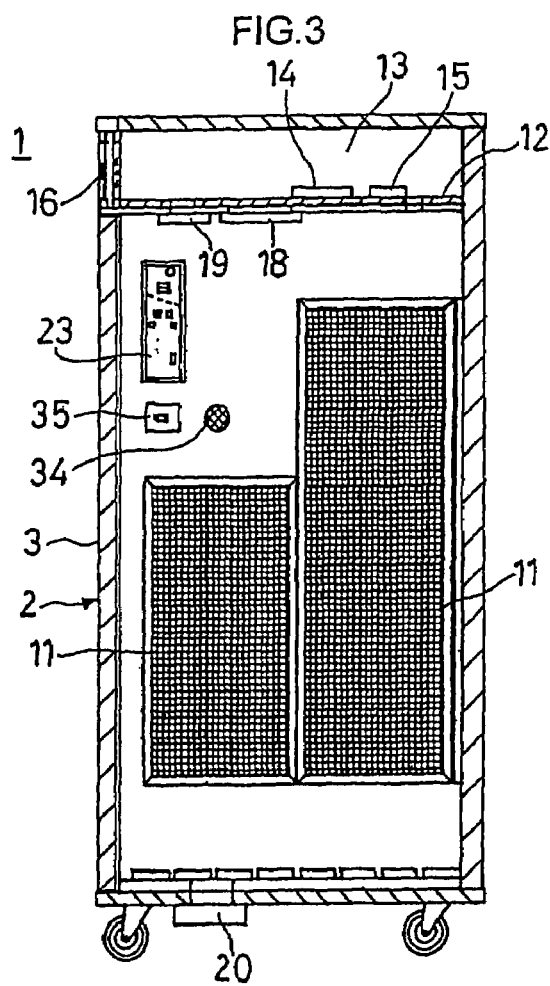
FIG. 3 is a left side sectional view of the thermotherapic sauna apparatus.

The following is the description of one embodiment of the thermotherapic sauna apparatus according to the present invention with reference to the drawings.

The thermotherapic sauna apparatus 1 has a sauna room 2 for keeping a dry hot atmosphere. The sauna room 2 is furnished with a box-shaped main body 3 of the sauna room and a front door 6 that opens or closes an entrance 5 installed on the front side of the main body 3 of the sauna room. The sauna room is spacious enough for one person to relax.

Figure 4:
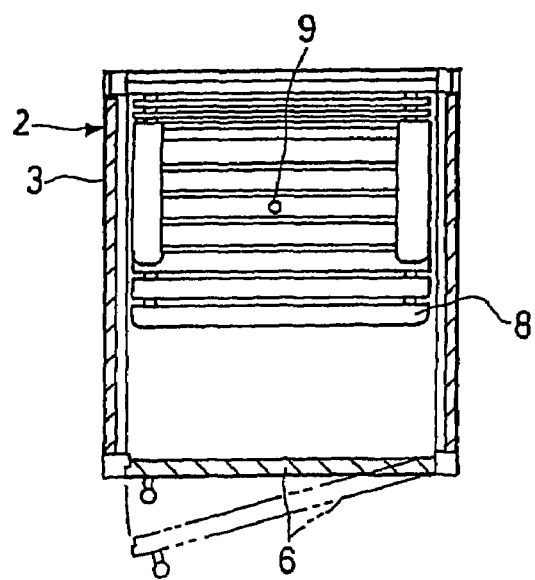
FIG. 4 is a top sectional view of the thermotherapic sauna apparatus.
Figure 5:
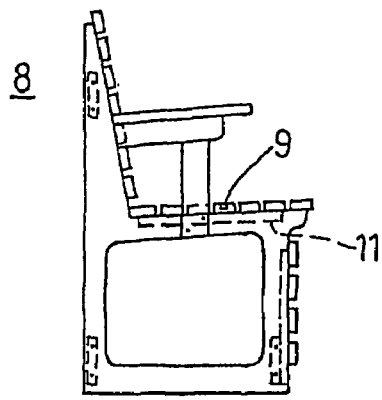
FIG. 5 is a side view illustrating a chair used for the thermotherapic sauna apparatus.

An observation window made of glass or the like is installed on the front door 6 so that people can look inside the sauna room 2. A wooden chair 8 with armrests is removably installed inside the main body 3 of the sauna room. The chair 8 is equipped with a seat switch 9 (see FIG. 4) used for detecting the seating state of an occupant.

On the free end section of the front door 6, a notch-shaped gap 13 is made leaving the free end side open. This gap 13 is used to introduce to the room an IV drip infusion line such as an IV drip infusion tube connected to an IV drip infusion pipe so that a patient receiving IV drip infusion can receive it in the sauna room 2 as well without removing the IV drip infusion pipe. Although it is made by cutting out part of the free end edge of the front door in the drawing, the gap can also be made on the entrance frame of the main body 3 of the sauna room or between them. Any shape or form of a gap is acceptable as far as an IV drip infusion line such as an IV drip infusion tube connected to an IV drip infusion pipe can be introduced to the room so that a patient connected with an IV drip infusion pipe can enter the sauna room 2 by opening the front door 6 while receiving IV drip infusion.

By installing the gap 13 between the entrance door and the entrance frame for introducing an IV drip infusion line, even a patent with an advanced disease receiving IV drip infusion can receive thermotherapy in the sauna room while continuing IV drip infusion, thereby enhancing its effect.

Planar heaters 11 are installed on given places inside the sauna room 2. More specifically, the planar heaters 11 are installed on the following ten places in total with given sizes such that temperature inside the sauna room 2 becomes as uniform as possible: two places on the wall on the back side of the main body 3 of the sauna room; two places each on the left and right walls; one place on the floor; two places on the inner side of the front door 6; and one place under the seating section of the chair 8. The planar heater 11 installed under the seating section of the chair 8 is connected to an electric power source cable through an outlet (not shown in the drawing).

Each planar heater 11 consists of, for example, a net and cloth for preventing burn, a planar heating element, an aluminum foil for reflecting heat, and a heat-insulation plate successively arranged and integrated into a frame. Said planar heating element is used for radiating far infrared rays and comprises, for example, a resistive film having a given electric resistance formed by applying a mixture of carbon powder and such binding material as polyethylene to an insulating substrate, a conducting wire installed on its entire length, and an electrically non-conducting heat-resistant and waterproof film covering its surface. The structure itself is well known in the art.

A divider plate 12 is placed on the ceiling section of the main body 3 of the sauna room. In the space divided by the divider plate 12, there are a controller 14 and a remote control receiver 15 and the like. The reference numerals 16 and 17 are openings connecting the space 13 to the outside. The underside of the divider plate 12 is equipped with an interior light 18 and an exhaust fan 19. An intake fan 20 is installed on the floor of the main body 3 of the sauna room.

Figure 6:
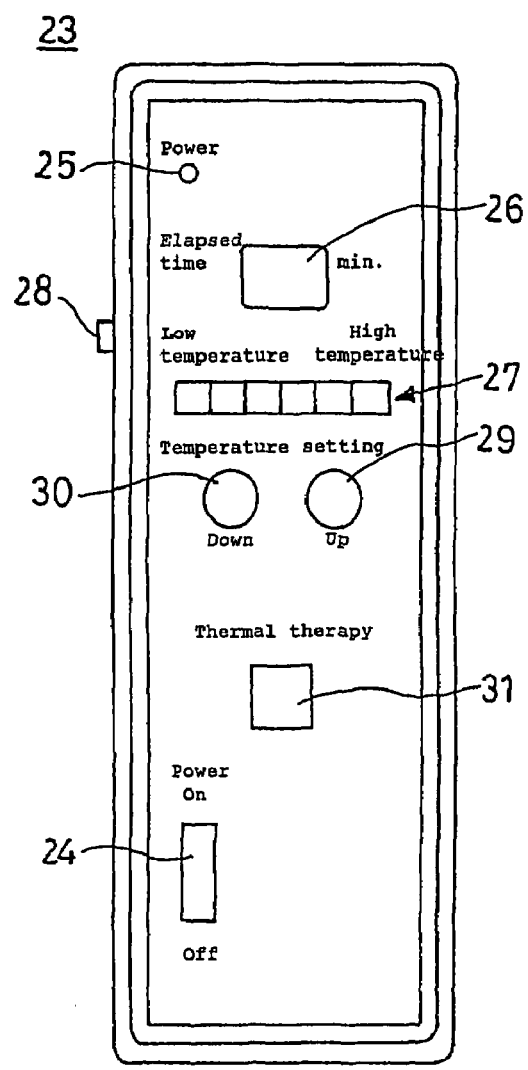
FIG. 6 is a front view of the control panel installed inside the sauna room of the thermotherapic sauna apparatus.

On the inner side of one of the sidewalls of the main body 3 of the sauna room, a control panel 23 is installed. As FIG. 6 shows, this control panel 23 is connected with a power source switch 24, a power source lamp 25, a time display 26 made of a liquid crystal panel and the like that displays elapsed time of sauna bathing, a temperature display 27 consisting of a plurality of LCD's that displays a setup temperature of the sauna room 2, a room temperature sensor 28 that measures room temperature, a heat-up switch 29 and a heat-down switch 30 used for bringing down or up, respectively, a setup temperature of the room in normal sauna bathing exclusive of thermal therapy, a thermotherapic mode setup switch 31 used for setting the thermotherapic mode, and the like.

In the vicinity of the control panel 23 of the main body 3 of the sauna room, a microphone 34 and an emergency stop button 35 are installed. On fixed places outside the sauna room 2, there are a speaker 36 for amplifying occupants voices from the microphone 34 and an alarm buzzer 37 that sets off an alarm corresponding to the emergency call button 35. Furthermore, a speaker and a microphone are installed on fixed places inside and outside the sauna room 2, respectively As described above, the microphone 34 and the speaker 36 are installed both inside and outside the room in this embodiment; therefore an occupant can communicate with people outside the room through the microphone 34 and the speaker 36 without opening the front door 6 or shouting in a loud voice when he/she felt sick during thermotherapy. Furthermore, pushing the emergency call button 35 sets off an alarm from the alarm buzzer 37 through the controller 14. As a result, people outside the room can take prompt action at the time of an emergency. In other words, safety can be guarantied.

Figure 7:
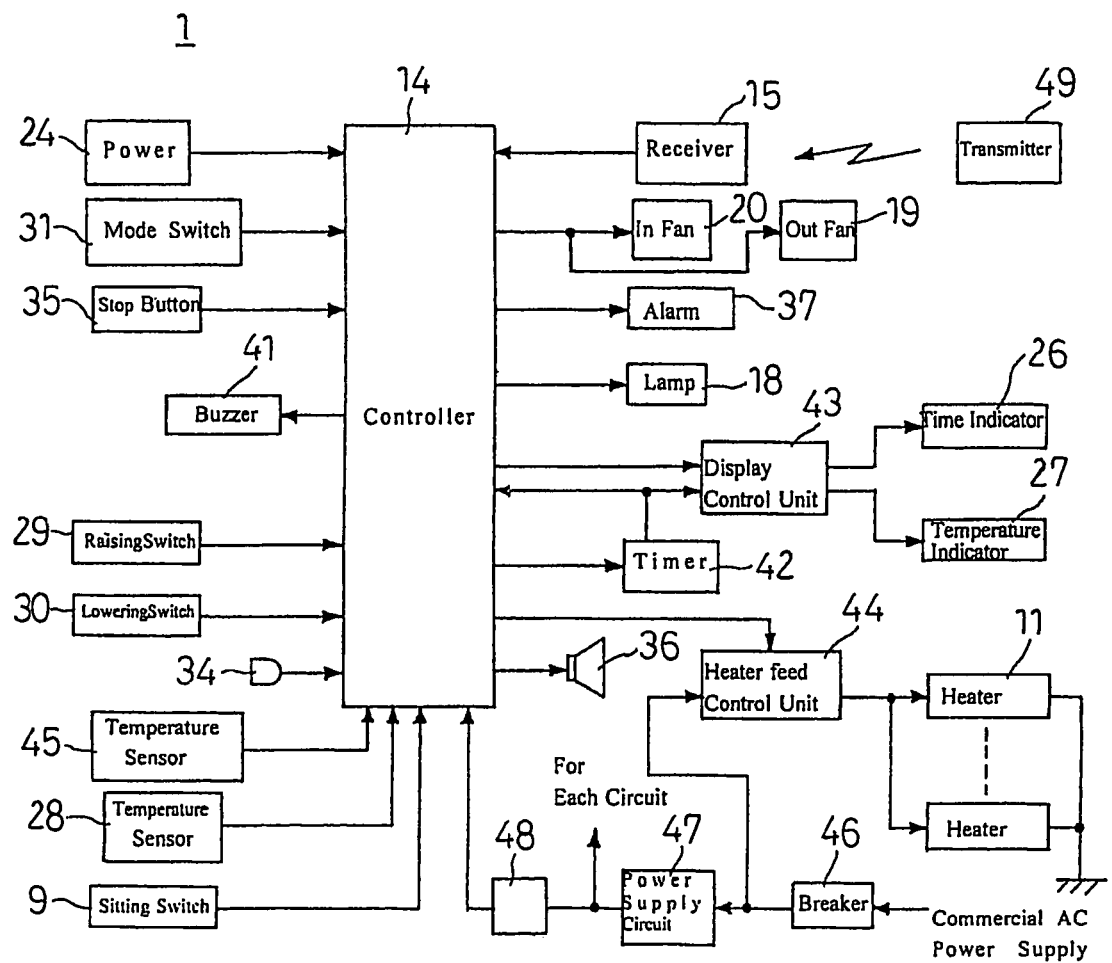
FIG. 7 is a block diagram of the controller of the thermotherapic sauna apparatus and the entire constitution of various devices attached to the controller.

FIG. 7 is a block diagram of the controller 14 and the entire constitution of various devices attached thereto.

The controller 14 in FIG. 7 is composed of a microcomputer and the like and controls the entire apparatus with the installation of a given control program. Especially in this embodiment, the controller 14 controls the intake fan 20, the exhaust fan 19, and the planar heater 11 according to the output of the room temperature sensor 28 in such a way that the room temperature of the sauna room 2 and the time form a predetermined thermotherapic bathing pattern when the thermotherapic mode is set by the thermotherapic mode setup switch 31 of the control panel 23 or a remote control transmitter 49 as described later. The controlling operation of the controller 14 for thermotherapy will be described later in more detail.

The reference numeral 41 is a report buzzer installed in the vicinity of the controller 14 for informing the progress of thermotherapy. The numeral 42 is a timer for clocking. The timer 42 starts clocking at a time when the seating/unseating switch 9 detects that an occupant has seated himself/herself on the chair 8. The numeral 43 is a display control unit that controls the displays of the abovementioned time display 26 and the temperature display 27 based on a command sent from the controller 14.

The reference numeral 44 is a heater power supply control unit that controls electric power supplied to the planar heater 11 such that room temperature takes a desired value and is composed of a combination of multiple relay circuits. The numeral 45 is a planar heater temperature sensor consisting of a thermistor and the like that detects the temperature of the planar heater 11 so as to guarantee safety. The numeral 46 is a breaker installed on the power source line of the commercial AC power source. The numeral 47 is a DC power source circuit that converts the commercial AC power to DC power. The numeral 48 is a reset circuit that resets the controller 14 in response to power on. The numeral 49 is a remote control transmitter that transmits a thermotherapic mode setup signal to the remote control receiver 15. The other devices have already been explained above.

Figure 8:
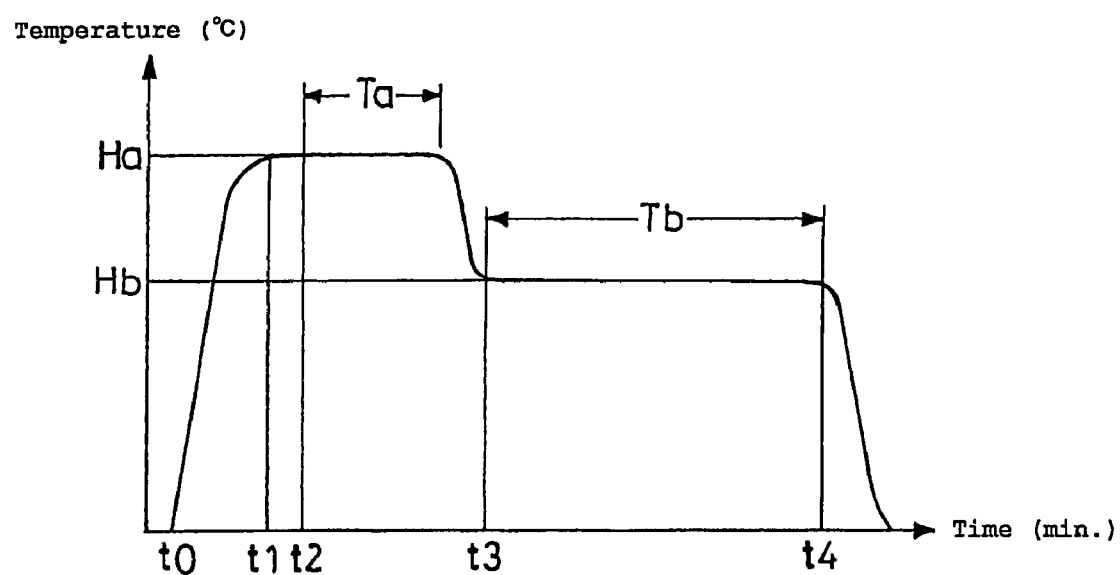
FIG. 8 is a time chart showing a thermotherapic bathing pattern.

Next, we explain the controlling operation of the controller 14 for thermotherapy by referring to the time chart in FIG. 8.

When the thermotherapic mode is set by the thermotherapic mode setup switch 31 or the remote control transmitter 49 (time t0 in FIG. 8), the controller 14 heats the planar heater 11 through the heater power supply control unit 44 based on the output of the room temperature sensor 28 such that room temperature of the sauna room 2 rises to a warming temperature Ha (60° C. in this example). In this case, the interior light 18 is kept off until room temperature reaches the warming temperature Ha.

The controller 14 turns on the interior light 18 at a time when room temperature reaches the warming temperature Ha. As soon as an occupant seats himself/herself on the chair 8 and the seat switch 9 is turned on, the controller 14 activates the timer 42 and keeps the warming temperature Ha until a given warming time (15 minutes in this example) elapses. In this manner, about 1.0~1.2° C. of the deep body temperature of the occupant can be raised.

Time runs out on the timer 42 when the abovementioned warming time Ta has elapsed. In consequence, the controller 14 intakes/exhausts air for the sauna room 2 by driving both of the intake fan 20 and the exhaust fan 19, with the result that room temperature declines.

Subsequently, the controller 14 stops the operation of both fans 19 and 20 at a time when it decides that room temperature has reached the heat-retention temperature Hb (40° C. in this example) based on the output of the room temperature sensor 28. It keeps this heat-retention temperature Hb until a given heat-retention time Tb elapses (30 minutes in this example).

Time runs out on the timer 42 at a time when the heat-retention time Tb elapses. Then, the controller 14 stops energizing the planar heater 11.

The controller 14 activates the report buyer 41 at a time when room temperature has reached the warming temperature Ha (time t 1 in FIG. 8), when it has reached the heat-retention temperature Hb (time t 3 in FIG. 8), and when the heat-retention time has elapsed (time t 4 in FIG. 8) based on the output of the room temperature sensor 28 and the clocking of the timer 42 in the abovementioned sequence control. In this manner, an occupant can adequately know about any progress of thermotherapy, which can prevent the occupant from leaving the sauna room unexpectedly before thermotherapy is completed. In other words, the invention can help avoid such a problem as the interruption of therapy.

Based on the past therapeutic results, it is most desirable to adopt the following bathing pattern in order to demonstrate adequate thermotherapic effect: warming temperature Ha is 60° C.; warming time Ta is 15 minutes; heat-retention temperature Hb is 40~45° C.; and heat-retention time Tb is 20~30 minutes. However, these values may not always be the best. Temperatures Ha and Hb and times Ta and Tb can be changed according to the conditions of an occupant such as a patient.

Thus, the thermotherapic sauna apparatus 1 according to this embodiment can bring about desired thermotherapic effect because an occupant of the sauna room 2 can receive sauna bathing according to a given thermotherapic bathing pattern without leaving the sauna room 2 by the operation of the automatic control of the controller 14. In this embodiment, the bathing pattern is set by combining both of the warming state and the heat-retention state. Unlike traditional apparatus, it becomes therefore unnecessary for an occupant to keep the heat-retention state by wrapping himself/herself in a blanket outside the sauna room after a period of the warming state, thereby reducing any burden on a patient, or an aged person.

The following are some examples of variations and applications of the abovementioned embodiment.

(1) In this embodiment, values of the thermotherapic bathing pattern, that is, warming temperature Ha, heat-retention temperature Hb, warming time Ta, and heat-retention time Tb are fixed in advance. It is, however, possible to change those values of Ha, Hb, Ta, and Tb each time of use by installing a separate adjustment switch.

(2) It is possible to install an ozone generator in the sauna room 2 so that the room can automatically be deodorized and sterilized in the absence of an occupant. The ozone generator can free an occupant from a lingering scent; it gives an occupant a fresh and neat impression instead.

(3) In consideration of disabled or aged people, it is also possible to install handrails on left, right and back sides of the sauna room 2 so that they can seat themselves on and stand from the chair 8 with ease.

(4) It is also possible to allow a person on a wheel chair to go in and out of the sauna room 2 by installing the chair 8 in a removable manner and a drain-board-shaped floorboard in a slidable manner on the floor of the sauna room 2 so that the level difference can be eliminated by pulling out the floorboard from the entrance 5 after the chair 8 is removed as the need arises.

(5) It is also possible to enhance convenience by installing a retractable table on one side of the chair 8 so that an occupant can pull out the table as the need arises or by additionally installing foldable legs on a drain-board-shaped floorboard so that an occupant can pull the table out to the front of the chair 8 as the need arises.

(6) It is also possible to attach a panel having a second-dimensional QR identification code to a proper place in the sauna room 2 so that an occupant can freely obtain information on thermotherapy by taking an image of the QR identification code with a camera of his/her cell phone and having access to a homepage on the Internet.

(7) It is also possible to install a pipe channel in advance for administering oxygen on the sidewall of the sauna room 2 depending on the symptoms of a patient subjected to thermotherapy (8) The present invention is not limited to the abovementioned embodiment and its variations. It is possible to change them, as the case may demand, within the limit of the spirit of the present invention.

We claim:

1. A thermotherapic sauna apparatus comprising a sauna room for keeping a dry hot atmosphere, having an intake/exhaust fan, a room temperature sensor for measuring room temperature, planar heaters positioned on inner walls of the sauna room that radiate far infrared rays, and a sequence controller, wherein said controller controls said fan and said planar heaters according to an output of said room temperature sensor so that the room temperature of the sauna room and the time can coincide with a predetermined thermotherapic pattern when a thermotherapic mode is set, wherein said sauna room has a gap between an entrance door and an entrance frame dimensioned for an IV drip infusion line connected to an IV drip infusion pipe to said sauna room from outside whereby a patient subjected to IV drip infusion can receive it in the sauna room without removing the IV drip infusion pipe.

2. The thermotherapic sauna apparatus according to claim 1, wherein said sauna room has at least one microphone and speaker both inside and outside the room so that people can have a conversation from both inside and outside of the room.

* * * * *